(12) United States Patent
Emerson et al.

(10) Patent No.: US 8,856,818 B2
(45) Date of Patent: Oct. 7, 2014

(54) SYSTEM AND METHOD FOR IN-HOME SET TOP BOX MANAGEMENT

(75) Inventors: David E. Emerson, Overland Park, KS (US); Gary W. LaFreniere, Olathe, KS (US); Michael S. Goergen, Medford, OR (US)

(73) Assignee: CenturyLink Intellectual Property LLC, Denver, CO (US)

( * ) Notice: Subject to any disclaimer, the term of this patent is extended or adjusted under 35 U.S.C. 154(b) by 500 days.

(21) Appl. No.: 12/619,764

(22) Filed: Nov. 17, 2009

(65) Prior Publication Data

US 2011/0119697 A1 May 19, 2011

(51) Int. Cl.
*H04N 7/16* (2011.01)
*H04N 21/258* (2011.01)
*H04N 21/475* (2011.01)
*H04N 7/173* (2011.01)

(52) U.S. Cl.
CPC ..... *H04N 21/4753* (2013.01); *H04N 21/25816* (2013.01); *H04N 21/4751* (2013.01); *H04N 21/25891* (2013.01); *H04N 7/17318* (2013.01); *H04N 21/25875* (2013.01)
USPC .......................................................... 725/25

(58) Field of Classification Search
CPC ............ H04N 21/4751; H04N 21/252; H04N 21/472; H04N 21/25875
USPC ......................................... 725/25–31, 46, 24
See application file for complete search history.

(56) References Cited

U.S. PATENT DOCUMENTS

| | | | |
|---|---|---|---|
| 6,564,005 B1 * | 5/2003 | Berstis | 386/239 |
| 6,618,858 B1 | 9/2003 | Gautier | |
| 6,701,523 B1 * | 3/2004 | Hancock et al. | 725/25 |
| 7,707,601 B2 * | 4/2010 | Runne | 725/25 |
| 2002/0194585 A1 * | 12/2002 | Connelly | 725/9 |
| 2003/0214957 A1 | 11/2003 | Wahoske et al. | |
| 2005/0076093 A1 * | 4/2005 | Michelitsch et al. | 709/217 |
| 2005/0160458 A1 * | 7/2005 | Baumgartner | 725/46 |
| 2005/0251823 A1 * | 11/2005 | Saarikivi | 725/42 |
| 2009/0018845 A1 * | 1/2009 | Morel | 705/1 |
| 2009/0300671 A1 * | 12/2009 | Scott et al. | 725/27 |

* cited by examiner

*Primary Examiner* — Benjamin R Bruckart
*Assistant Examiner* — Aklil Tesfaye
(74) *Attorney, Agent, or Firm* — Swanson & Bratschun, L.L.C.

(57) ABSTRACT

A video services control system comprises a set top box coupled to a television and a video services network configured to provide video services to the television via the set top box. The video services network includes an application program operable to develop and implement individualized usage restriction profiles for users of the set top box to control video services viewing. The application program is configured to provide a designated administrator with authority to dictate the usage restriction profile for non-designated users. The individualized usage restriction profiles include restrictions on the content of video services shown on the television for viewing by the users. The application program is configured to receive information input by the designated administrator, develop each usage restriction profile based on the input information unique to each user, and implement each usage restriction profile to control video services viewing by the users.

19 Claims, 6 Drawing Sheets

SYSTEM AND METHOD FOR IN-HOME SET TOP BOX MANAGEMENT

TECHNICAL FIELD OF THE DISCLOSURE

The present disclosure relates generally to delivery of in-home video services, and in particular, to an improved system and method for in-home management of set top boxes.

BACKGROUND OF THE DISCLOSURE

Children have been engaging in television viewing through set top boxes and other devices as entertainment for many years. Often, parents or other adults desire to control, manage, limit or restrict the television viewing that children or other household users engage in. Previous prior art systems, such as parental control systems, have attempted to implement control systems to restrict television viewing by children and other users. As an example, the V-Chip System is designed to control television viewing based on pre-designated rating factors. However, among other problems, parents may disagree with the rating factors, which can lead to non-acceptable programs being viewable by children and acceptable programs being blocked out. Other systems enable a parent or other designated user the ability to block channels using a password. However, blocking channels does not control other users from excessive television viewing of other channels or programs, or provide other types of restrictions on television viewing. The prior art control systems are vastly limited and do not provide mechanisms for broad television viewing control. There is therefore a need for a system and method for in-home set top box management to address these and other needs.

SUMMARY OF THE DISCLOSURE

In certain embodiments, a video services control system comprises a set top box operatively coupled to a television and a video services network communicatively coupled to the set top box and configured to provide video services to the television via the set top box. The video services network includes an application program operable to develop and implement individualized usage restriction profiles for two or more users of the set top box to control video services viewing by the users. The two or more users include one or more non-designated users and a designated administrator. Additionally, the application program is configured to provide the designated administrator with authority to dictate the usage restriction profile for each non-designated user. Each individualized usage restriction profile includes one or more restrictions on the content of video services shown on the television for viewing by the corresponding user. The application program is configured to receive information input by the designated administrator, develop each usage restriction profile based on the input information unique to each user, and implement each usage restriction profile to control video services viewing by the users.

In certain other embodiments, a video services control system comprises a set top box operatively coupled to a television and a video services network communicatively coupled to the set top box and configured to provide video services to the television via the set top box. The video services network includes an application program operable to develop and implement at least one usage restriction profile for a non-designated user of the set top box based on information received from a designated administrator with authority to dictate the usage restriction profile for the non-designated user via the application program. The usage restriction profile includes restrictions on the content, amount and timing of video services shown on the television for viewing by the non-designated user, the amount of recording of video services allowed by the non-designated user, and the purchasing of video services allowed by the non-designated user. Additionally, the application program is configured to receive information input by the designated administrator, develop the usage restriction profile based on the input information, and implement the usage restriction profile to control video services viewing by the non-designated user.

In yet other embodiments, a method comprises operably coupling a set top box to a television, powering on the set top box, and connecting the set top box to a video services network configured to provide video services to the television via the set top box. The method includes applying an application program to the video services network. The program is operable to develop and implement individualized usage restriction profiles for two or more users of the set top box to control video services viewing by the users. The two or more users include one or more non-designated users and a designated administrator. Additionally, the application program is configured to provide the designated administrator with authority to dictate the usage restriction profile for each non-designated user. The method also includes the application program receiving information input from the designated administrator, the information including one or more individualized restrictions for each non-designated user on the content of video services shown on the television for viewing by each non-designated user. Further, the method includes the application program developing a usage restriction profile for each non-designated user based on the input information received from the designated administrator unique to each non-designated user.

BRIEF DESCRIPTION OF THE DRAWINGS

FIGS. 2-5B are flowcharts describing methods of in-home set top box management according to embodiments of the present disclosure.

DETAILED DESCRIPTION OF THE VARIOUS EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
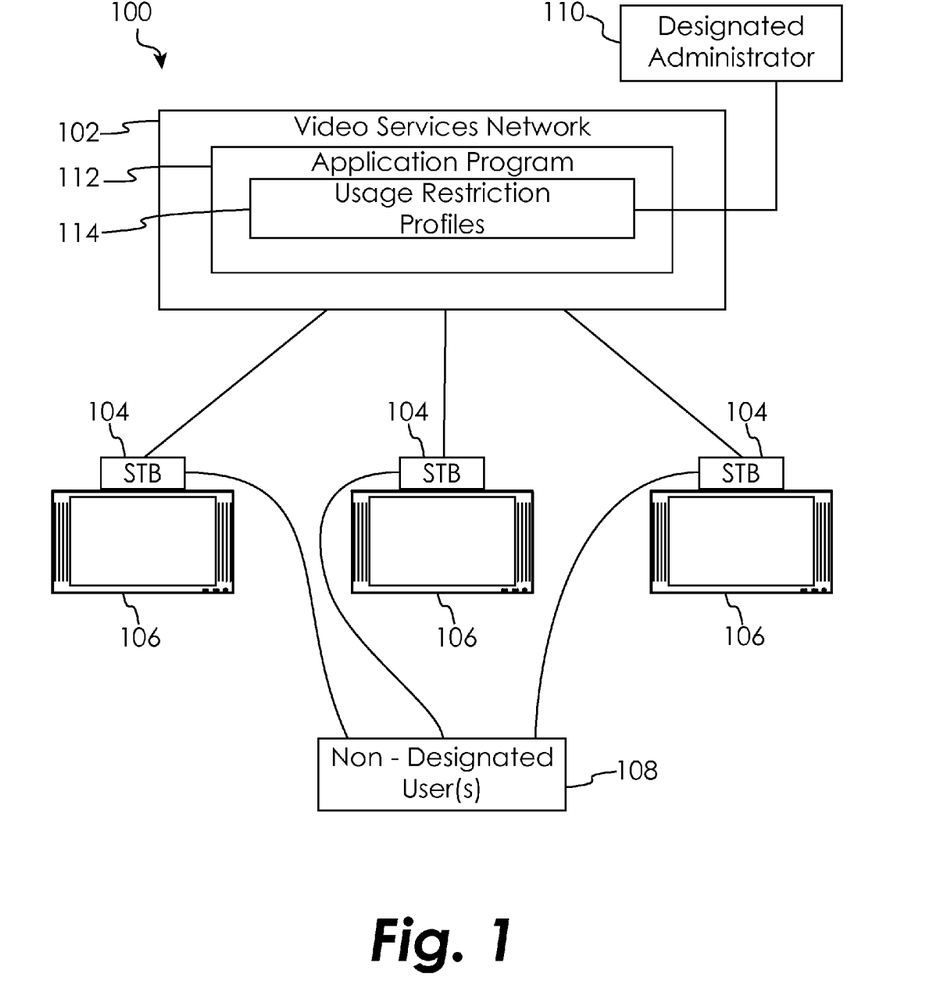
FIG. 1 is an illustration of an exemplary system adapted for in-home set top box management according to an embodiment of the present disclosure.

FIG. 1 is an illustration of an exemplary system 100 configured for in-home set top box management in accordance with the principles of the present disclosure. As shown, a video services network 102 is communicatively connected to one or more set top boxes (STB or STBs) 104. The STBs 104 are operatively coupled to television sets (TV or TVs) 106. The video services network 102 is configured to provide video services to the TVs via the STBs, with the TVs receiving video signals from the STBs. In certain embodiments, the STBs 104 and TVs 106 are located in the same living or working environment, such as the same residential home or office, and/or are included in the same video services account. Additionally, the STBs 104 and TVs 106 may be accessed by a plurality of users, including one or more non-designated users 108 and a designated administrator 110. The video services network 102 includes an application program 112 designed to develop and implement individualized usage restriction profiles 114 for the non-designated users 108 based on information received from the designated administrator 110. The individualized usage restriction profiles include restrictions on the content of video services shown on the TVs 106 for viewing by the non-designated users 108.

When an installer arrives at a customer premises to install new service, the STBs 104 must be discovered and provisioned by the system 100 before video content can be delivered. Various methods are known in the art for discovering and provisioning STBs, the details of which are not important to the present disclosure. Additionally, the manner in which video services are transmitted to the STBs 104 is not critical to the present disclosure. As an example, in certain embodiments, the video services network 102 may be communicatively linked with and/or include a content provider and/or video server arrangement. In such embodiments, the server may be operable to store video content delivered, transferred and/or uploaded to it from the content provider, and deliver the video content over a network. The video content may be delivered to subscribers over the network via an access node connecting subscribers to the network and/or a residential gateway in the subscriber's home coupled with the STBs.

In order to administer the access of the various services to individual subscribers, the video services network 102 may also be linked with and/or include a support system server. The support system server maintains a database which keeps track of the services a customer has subscribed to and may optionally contain sensitive customer information. The same or additional servers may be provided to manage video content delivery including video-on-demand (VOD) and pay-per-view (PPV) to the subscribers.

The components of system 100 may include typical processing unit, memory, storage, and input/output devices. Additionally, it shall be understood that the functionality of the various system components discussed herein may be incorporated into one or more other components. It shall be further understood that the system components may be located in the same physical location or in separate locations from one another. Additionally, it should be appreciated that the representation in FIG. 1 is for illustrative purposes and is not intended to be a detailed drawing showing all the components of the system. Further, for the sake of brevity, much of the standard internal workings, processes and operations of a video services system will be not be described in detail herein, as they are well-known to those of ordinary skill in the art.

Although the principles of the present disclosure are described in association with STBs 104, it should be understood that the STB functionality may be incorporated into a television, a digital video recorder (DVR), or a similar device and use the principles of the present disclosure in the same or similar manner. Additionally, the principles of the present disclosure may also be applied to video content delivered over the internet.

Figure 2:
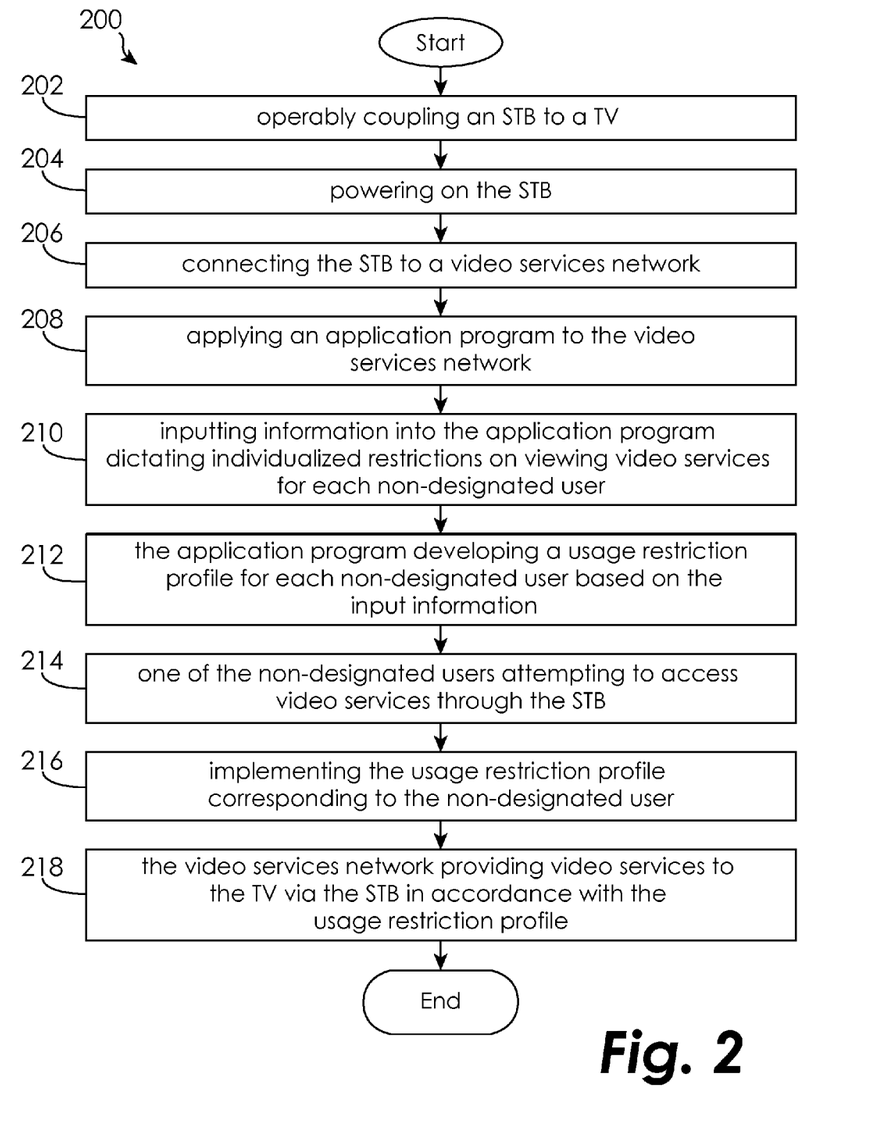
Figure 3:
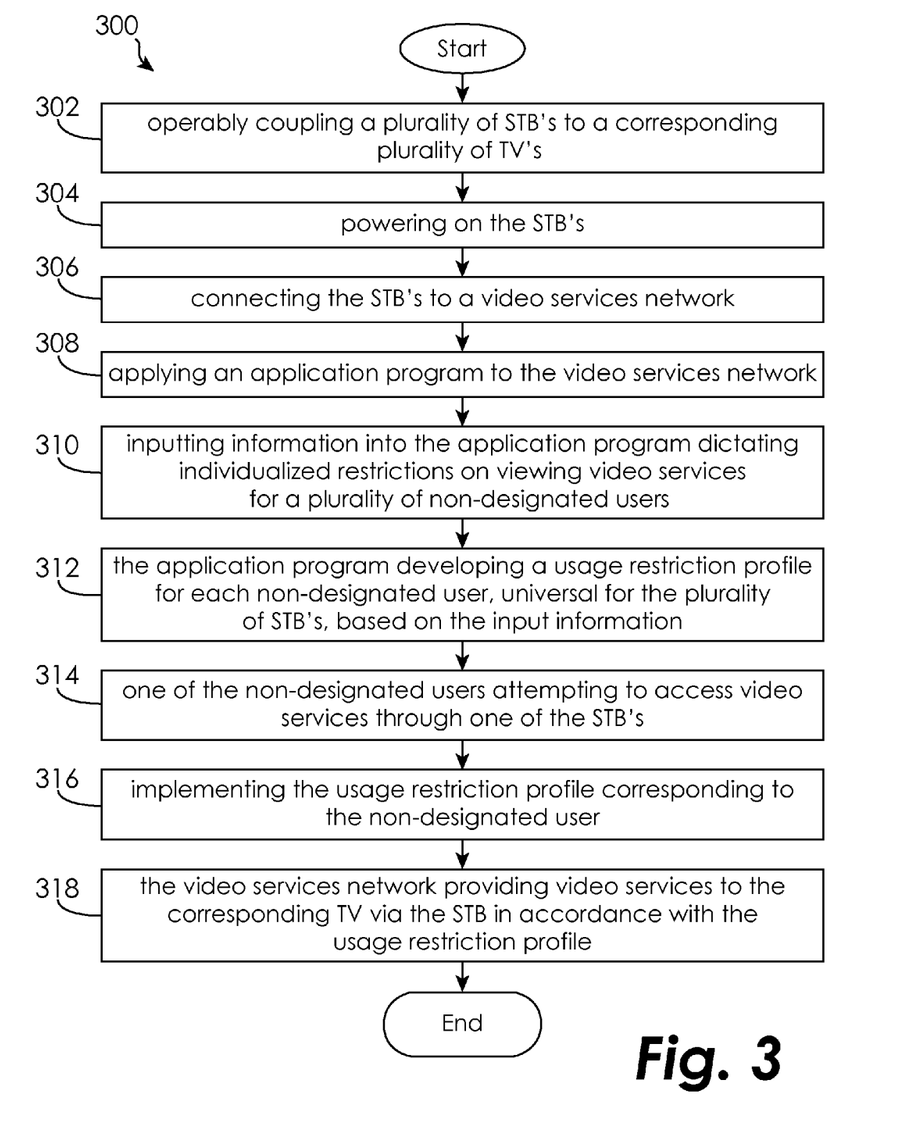
Figure 4:
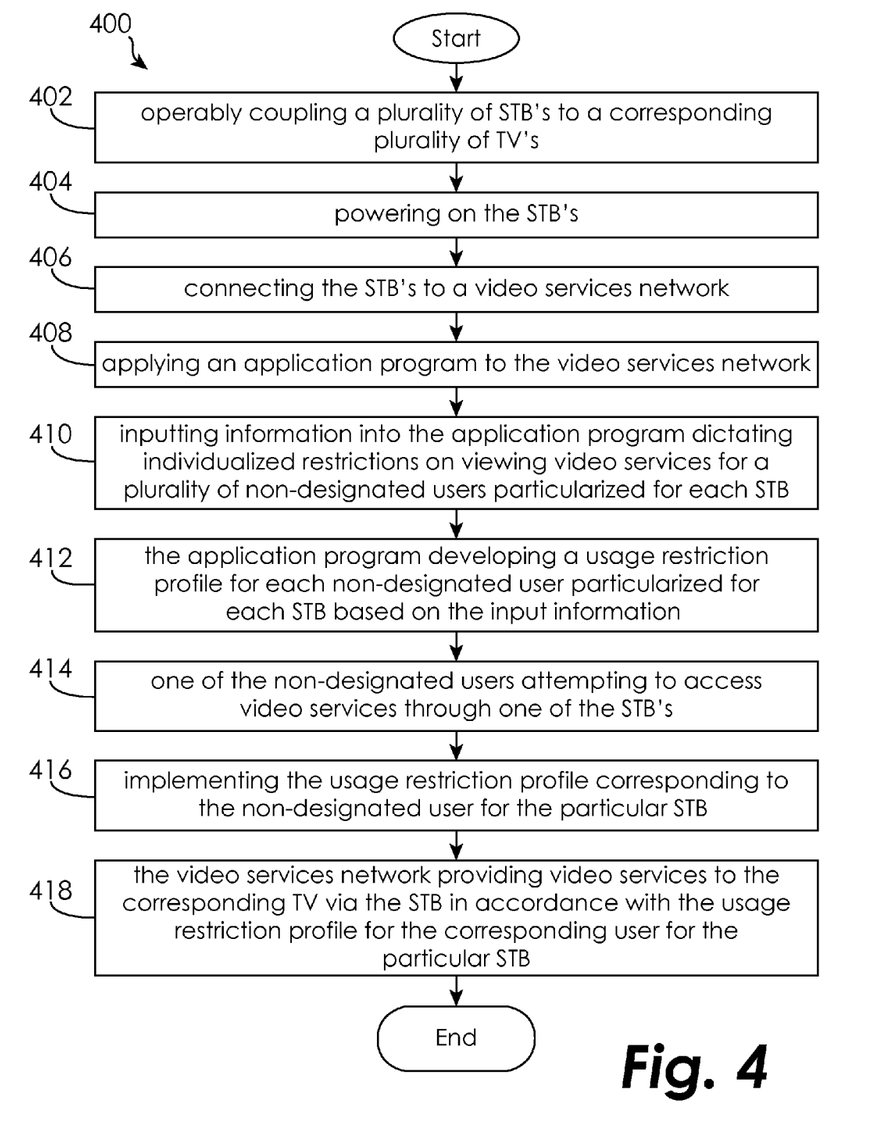
Figure 5A:
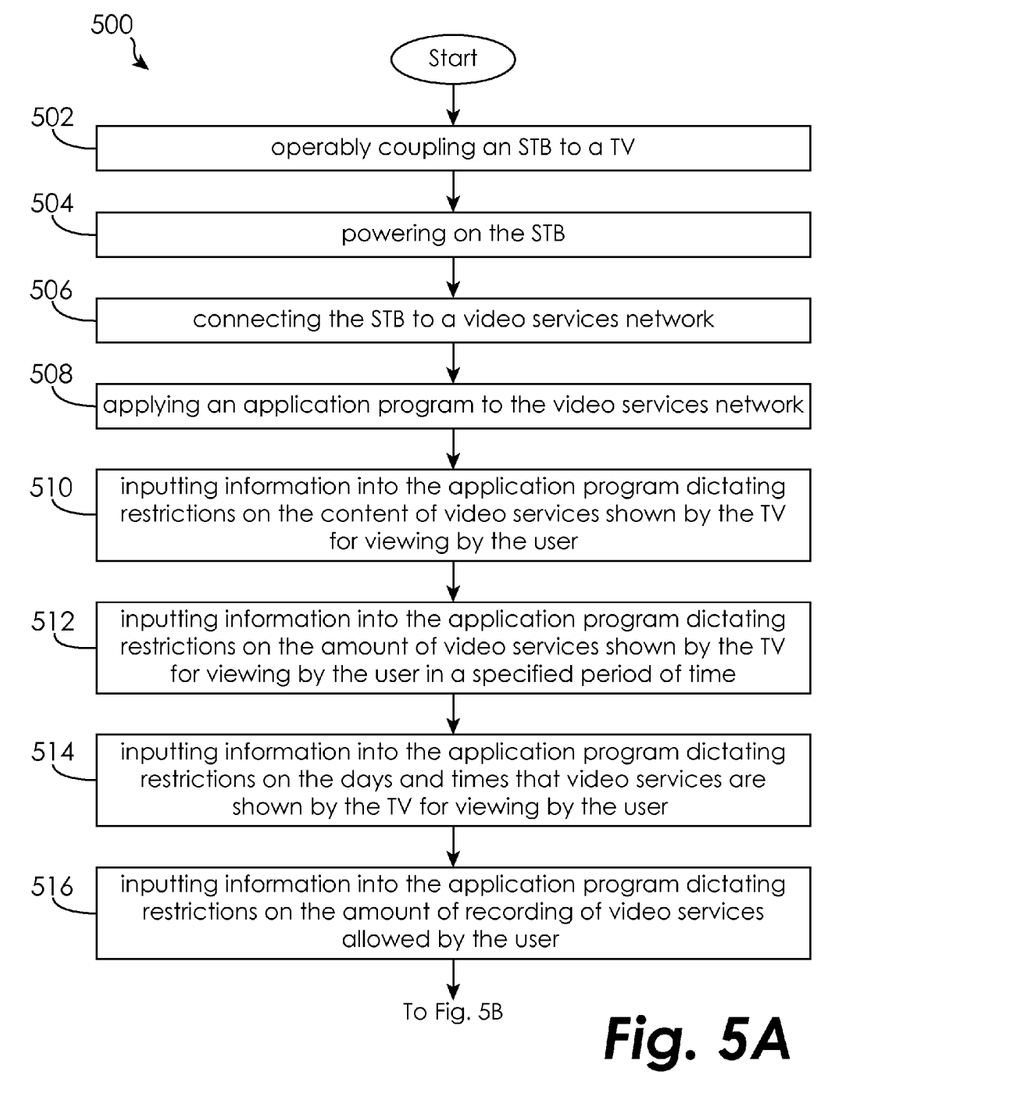
Figure 5B:
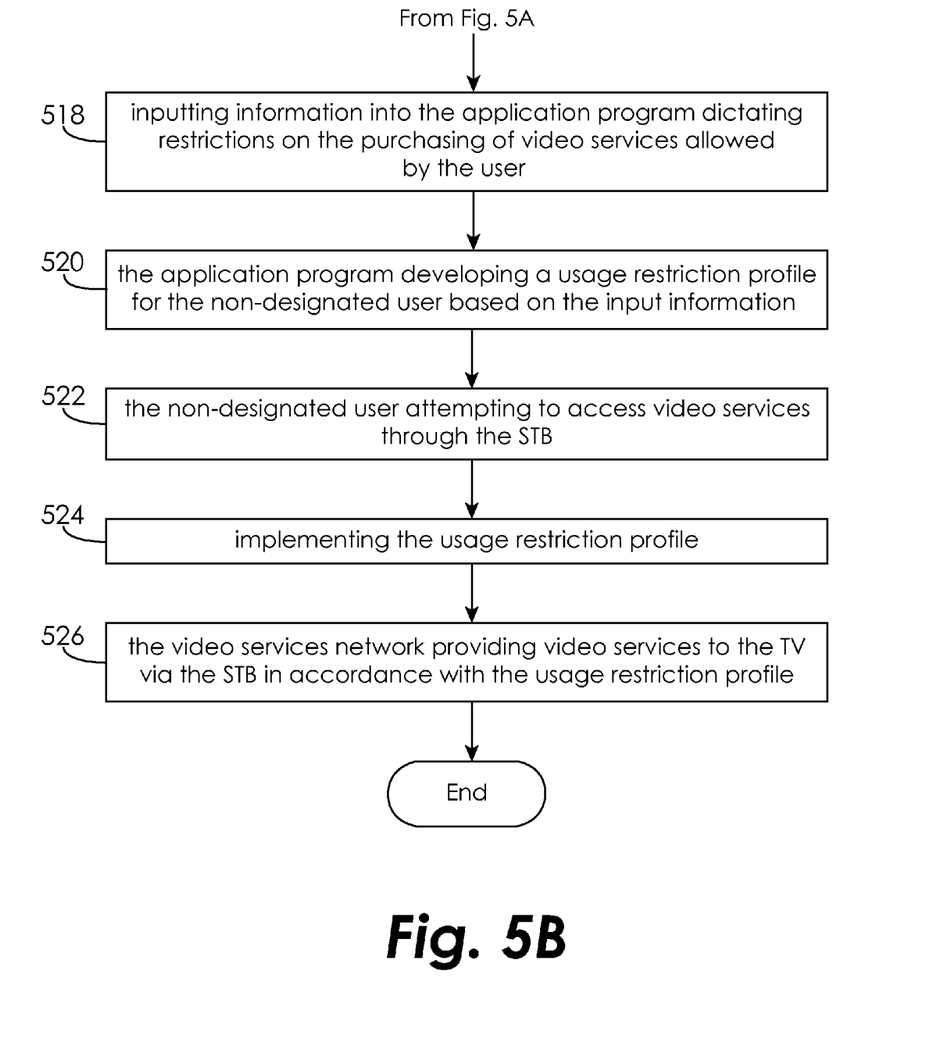

FIGS. 2-5B are flowcharts representing various example methods of managing in-home STB use according to the present disclosure. More specifically, the flowchart shown in FIG. 2 provides an overview of an example method contemplated by the present disclosure, the flowcharts shown in FIGS. 3-4 provide example methods involving multiple non-designated users and multiple STBs, and the flowchart shown in FIGS. 5A-5B provides an example method involving multiple restrictions for a non-designated user. It should be appreciated that the timing and/or order of the steps in the flowcharts can be varied as would occur to one of ordinary skill in the art. Additionally, the flowcharts shown in later figures include many of the same or similar steps as discussed with respect to the methods shown in earlier figures. Accordingly, such repeated steps will not be discussed again with respect to the methods in the later figures for the sake of brevity.

Method 200 shown in FIG. 2 begins with operably coupling an STB to a TV at step 202, powering on the STB at step 204 and connecting the STB to a video services network at step 206. In certain embodiments, the subscriber, a qualified technician, or another appropriate individual may perform steps 202, 204 and/or 206. In other embodiments, at least step 206 may occur automatically as part of the discovery and provisioning processes of the STB. At step 208, an application program is applied to the video services network. In certain embodiments, this may occur before the other steps in the method take place. Additionally, the application program is typically applied by the service provider as part of the development of the video services network. Alternately, it is contemplated that the application program may be loaded or otherwise occur on the one or more STBs in addition to or in lieu of the application program occurring as part of the video services network. The manner of development and application of the program is not critical to the present disclosure. In certain embodiments, the subscriber may request participation in the presently-disclosed system and, upon receiving such request, the video services network may designate the application program to cover or encompass all of the one or more STBs in the household or viewing environment.

As mentioned above with respect to FIG. 1, the application program is configured to develop and implement individualized usage restriction profiles for a plurality of users within the same account or household or viewing location and/or accessing the same one or more STBs. The usage restriction profiles are developed based on information received from a designated administrator on the account. The individualized usage restriction profiles include restrictions on the content of video services shown on the TVs for viewing by the remaining users associated with the same account, referred to as non-designated users. In certain embodiments, the designation of an administrator and creation of log-in or access information and authorization for the designated administrator occurs during the set-up process of the account and/or the provisioning process that occurs on the STBs. In other embodiments, the account and the corresponding STBs may be provisioned and operational prior to enrollment in and usage of the application program to manage the household STBs. In a particular embodiment, the designated administrator may be a parent and the non-designated users may be children in the household, enabling the parent to create individualized viewing restriction profiles for the children.

At step 210 in method 200, the designated administrator accesses the application program via the administrator's assigned log-in or access information to input information dictating individualized viewing restrictions on video services for the non-designated users in the household or viewing environment, including at least one viewing restriction for at least one non-designated user. The designated administrator may access the application program in a variety of ways, including through the STB, through an internet program linked with the application program, and/or through a remote control device operatively coupled with the TV and/or the STB, as non-limiting examples. Other appropriate means of accessing the application program and inputting information are contemplated by the present disclosure. At step 212, the application program develops a usage restriction profile for each non-designated user based on the information received from the designated administrator. It is contemplated that the application program may be designed and configured to develop the usage restriction profiles according to a variety of appropriate techniques and mechanisms that would occur to one of ordinary skill in the art. According to typical techniques, the application program may take the information received from the designated administrator and compile and transform the information into individualized usage restriction profiles that can be implemented to restrict video services viewing.

In certain embodiments, the designated administrator may access the application program and input individualized viewing restrictions via a user interface. The user interface may be menu driven, for example. The application program may then save the input information in a database in the form of usage restriction profiles that can be checked or monitored as non-designated users attempt to access video services. The information or profiles may be checked on a continual, periodic or as-needed basis. In other embodiments, the application program may include software operable to receive the input viewing restrictions and formulate software code routines that can be run by the STB or other appropriate device during the usage checking or monitoring procedure.

As one example, the designated administrator may input information into the application program dictating that a first non-designated user is prohibited from viewing mature-rated video content. The application program incorporates this restriction into the first non-designated user's usage restriction profile. Whenever the first non-designated user attempts to access video content, the STB determines the content rating of the video content and compares the content rating to the information in the usage restriction profile to determine if the first non-designated user is authorized to view the particular video content. The STB may access the usage restriction profile in this manner on a continual basis, such as every few seconds as one example, or may access the usage restriction profile each time the first non-designated user attempts to view new video content.

As another example, the designated administrator may input information into the application program dictating that a first non-designated user is prohibited from viewing video content during particular times of the day. The application program incorporates this restriction into the first non-designated user's usage restriction profile. Whenever the first non-designated user attempts to access video content, the STB determines the current time of day and accesses the information in the usage restriction profile to determine if the first non-designated user is authorized to view the video content at this particular time of day.

In addition to the designated administrator being assigned log-in or access information, the non-designated users may also be assigned log-in or access information to request video services viewing via an STB. In some embodiments, the non-designated users may be prompted to develop log-in or access information at the first time of logging into the application program and/or the first attempt to view video services through the STB. In certain embodiments, an STB incorporated within the presently-disclosed system will not be authorized to transmit video services to a TV until valid log-in or access information has been received from either a non-designated user or the designated administrator. At step 214, one of the non-designated users enters in their corresponding log-in or access information in an attempt to access video services through the STB. Upon receiving the log-in or access information, the application program retrieves the non-designated user's usage restriction profile developed at step 212. At step 216, the application program implements the particular non-designated user's usage restriction profile to control or manage the video services transmitted from the STB through the TV. At step 218, the video services network provides video services to the TV via the STB in accordance with the usage restriction profile for the particular non-designated user.

The present disclosure contemplates a variety of possible restrictions on viewing video services that may be encompassed by an individualized usage restriction profile, with each profile including at least one type of viewing restriction. In certain embodiments, the usage restriction profiles may include restrictions on the content of video services allowed for viewing by the corresponding non-designated users. As non-limiting examples, the content restrictions may include restrictions on particular programs, particular channels, particular content ratings, particular actors or actresses, and/or particular types of programs, such as soap operas, talk shows or movies. Additionally, the usage restriction profiles may include restrictions on the amount of video services allowed for viewing by the corresponding non-designated users. The restrictions on the quantity of viewing may be based on the total allowed viewing time in a specified period of time, such as per day, per week or per month. In such cases, if the non-designated user has already viewed the maximum allowed quantity of video services in the specified period of time, the usage restriction requirement does not authorize additional viewing.

As another option, the usage restriction profiles may include restrictions on the allowed timing of viewing video services by the corresponding non-designated users. As examples, the timing restrictions may be based on days of the week and/or times during the days that the corresponding non-designated user is authorized to view video services. Further, in other aspects, the usage restriction profiles may include restrictions on the amount of recording of video services allowed by the corresponding non-designated users. In such embodiments, each non-designated user may be limited to a specified allotment of recording space on an STB for recording video services. In certain embodiments, the usage restriction profiles may include restrictions on the purchasing of video services by the corresponding non-designated users. As examples, the purchasing restrictions may include limitations on the amount of purchasing allowed, the content of what may be purchased, including particular programs and/or purchasing from particular channels, and/or complete purchasing bars. In a particular embodiment, the usage restriction profile may include restrictions on Pay Per View purchases by the corresponding non-designated user. Other types of limits or restrictions may be implemented by the present system as would occur to one of ordinary skill in the art. In addition to the various restrictions discussed above, the profile for each user may also include settings and preferences related to video services viewing that may be dictated by the particular non-designated user and/or the designated administrator.

It should be appreciated that the usage restriction profiles may be implemented in a variety of appropriate manners as would occur to one of ordinary skill in the art. In certain embodiments, the application program, the video services network and/or the STB may cease providing or otherwise block video services from being transmitted and/or shown if the content, amount or timing of the video services would violate one or more restrictions in the usage restriction profile. In other embodiments, the application program, the video services network and/or the STB may be configured to change the channel on the TV if the video services transmitted via the original channel would violate one or more restrictions and not allow the original channel to be viewed by the user. In yet other embodiments, a menu or similar type of user interface may be displayed on the screen to prompt the user to make another channel selection and/or turn off the television for viewing. When restrictions regarding the amount of purchasing and recording of video services are enforced, a message may be displayed on the television screen informing the viewer that purchasing or recording is not permitted in accordance with the particular user's usage restriction profile. In certain embodiments, a message may be directed to the designated administrator informing the administrator that one or more restrictions were enforced and the details surrounding the event.

The application program is designed to develop individualized usage restriction profiles for each non-designated user based on information received from the designated administrator. Additionally, the individualized usage restriction profiles are individualized such that one usage restriction profile may include a purchasing restriction, while another may not, depending on the limitations dictated by the designated administrator. In certain embodiments, the designated administrator may access the application program as desired and update or modify any of the usage restriction profiles at any time. Accordingly, the various restrictions may be considered semi-permanent in that the designated administrator may be authorized to modify the restrictions. Alternatively, the restrictions may become permanent as initially dictated by the designated administrator, with the designated administrator being unable to modify the restrictions. In certain other embodiments, the application program may allow for various restrictions to be temporarily set. In such embodiments, certain restrictions may be temporarily employed as desired by the designated administrator as a negative consequence for the particular non-designated user.

In certain optional embodiments, the usage restriction profiles may be based not only on information received from the designated administrator, but also on supplemental information designed to enhance each usage restriction profile based on the content of video services that the particular user may be inclined to enjoy. As one non-limiting example, the supplemental information may be information preprogrammed into the application program which identifies video services content that is similar to the content dictated by the designated administrator as allowable for viewing for the particular user. The similar content may be incorporated into the usage restriction profile as allowable for viewing. As another example, the supplemental information may be based on feedback received from the particular user regarding the content of certain video services. Positive or negative feedback may dictate the inclusion of additional video services content or the deletion of existing video services content from the user's usage restriction profile. As yet another example, the supplemental information may be based feedback received from a second user and used to refine the usage restriction profile for a first user. In this way, the usage restriction profiles may be fluid as feedback, pre-identified similar content and/or other appropriate supplemental information is received and populated into the profiles.

Turning to FIG. 3, the example method 300 is directed to an embodiment involving multiple non-designated users and multiple STBs. Method 300 includes steps 302 through 308 similar to steps 202 through 208 in FIG. 2 except that multiple STBs in the household are provided and connected with the video services network and the application program. At step 310, the designated administrator accesses the application program via the assigned log-in or access information to input information dictating individualized viewing restrictions on video services, examples of which are discussed above, for each of a plurality of non-designated users in the same household or viewing environment. At step 312, the application program develops a usage restriction profile for each non-designated user based on the information received from the designated administrator. In the optional embodiment disclosed with respect to method 300, the individualized usage restriction profiles for the non-designated users are universal for the plurality of STBs. In other words, the restrictions embodied in each usage restriction profile are applicable on all of the plurality of STBs and each non-designated user will be limited with respect to video services at each STB/TV combination in the household. Steps 314 through 318 are similar to steps 214 through 218 in FIG. 2 and therefore the discussion of such steps will not be repeated for the sake of brevity.

Example method 400 shown in FIG. 4 is directed to another embodiment involving multiple non-designated users and multiple STBs. Method 400 is similar to method 300 discussed above, except that the embodiment described with respect to method 400 provides for different usage restriction profiles for each non-designated user for each of the plurality of STBs. Method 400 also includes steps 402 through 408 similar to steps 202 through 208 and 302 through 308, which will be not be discussed again for brevity. At step 410, the designated administrator inputs information into the application program dictating individualized restrictions on video services for the non-designated users particularized for each STB. Thereafter at step 412, the application program develops usage restriction profiles for each of the non-designated users for each of the different STBs based on the input information. In this way, the restrictions in the usage restriction profiles for each non-designated user may differ between STBs, with the non-designated user being subject to certain restrictions on certain STBs and not others. For example, a parent who is a designated user may restrict a non-designated user child from accessing certain video services in the family room after a predetermined time of day, but allow such access in the child's bedroom where the television is less likely to disturb others in the home. As another example, the non-designated user child may be restricted in using space on the DVR located in the family room, but may be authorized to use all of the space on the DVR located in the child's bedroom.

At step 414, one of the non-designated users attempts to access video services through a particular STB via user-specific log-in or access information. Upon receiving the log-in or access information and information representing the particular STB through which video services are being requested, the application program retrieves the non-designated user's usage restriction profile for the particular STB. At step 416, the application program implements the usage restriction profile to control or manage the video services transmitted from the particular STB through the corresponding TV. At step 418, the video services network provides video services to the TV via the particular STB in accordance with the usage restriction profile for the corresponding non-designated user for the particular STB.

FIGS. 5A and 5B illustrate an example method 500 according to another embodiment of the present disclosure. Method 500 is directed to an embodiment involving at least one non-designated user being restricted with respect to video services in a variety of different ways. Method 500 includes steps 502 through 508 similar to steps 202 through 208, 302 through 308, and 402 through 408, and therefore the discussion of such steps will be not be repeated for the sake of brevity. At steps 510 through 518, the designated administrator inputs information into the application program dictating a variety of restrictions on viewing video services for the non-designated user, including the content of the video services that may be viewed, the amount of video services that may be viewed, the days and times at which the video services may be viewed, the amount of permitted recording, and purchasing restrictions, respectively. At step 520, the application program develops a usage restriction profile for the non-designated user embodying all the various restrictions dictated by the designated administrator at steps 510 through 518. In certain embodiments, the embodiment discussed with respect to method 500 may include only one non-designated user, with the single non-designated user being subject to multiple types of viewing restrictions. In other embodiments, the method may involve a plurality of non-designated users being subject to the multiple types of restrictions. Steps 522 through 526 are similar to steps 214 through 218, steps 314 trough 318, and steps 414 through 418, and therefore the discussion of such steps will not be repeated for the sake of brevity.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A video services control system, comprising:
a set top box operatively coupled to a television;
a video services network communicatively coupled to the set top box and configured to provide video services to the television via the set top box;
wherein the video services network includes an application program operable to develop and implement individualized usage restriction profiles for two or more users of the set top box to control video services provided to the users, wherein the two or more users include one or more non-designated users and a designated administrator, wherein the application program is configured to provide the designated administrator with authority to dictate the usage restriction profile for each non-designated user, wherein each individualized usage restriction profile includes one or more restrictions on video services provided to the set top box by the video services network for the corresponding user, wherein the application program is configured to receive information input by the designated administrator, develop each usage restriction profile based on the input information unique to each user, and implement each usage restriction profile to control video services provided to the users, and;
wherein the application program is further configured to receive supplemental information comprising:
feedback regarding the video services content, from a first user other than the designated administrator; wherein the first and second users are the persons who are subject to a usage restriction profile;
identification of video services content by the application program that is similar to the video services content dictated in the usage restriction profile by the designated administrator as allowable for viewing by the first user other than the designated administrator; and
feedback regarding the content of the video services content, from a second user other than the designated administrator, wherein the usage restriction profile for the first user other than the designated administrator is modified based upon the supplemental information; and wherein each user is assigned individualized access information, wherein upon receiving the individualized access information for one of the users, the application program is operable to implement the corresponding usage restriction profile and transmit an authorization of video rights to the set to box in accordance with the usage restriction profile.

2. The system of claim 1, wherein the application program is configured to deny access to each usage restriction profile for modification by the non-designated users.

3. The system of claim 1, wherein each individualized usage restriction profile includes one or more restrictions on the total amount of time that video services are shown by the television for viewing by the corresponding user in a specified period of time based on information input by the designated administrator into the application program.

4. The system of claim 1, wherein each individualized usage restriction profile includes one or more restrictions on the days of the week and times of the day that video services are shown by the television for viewing by the corresponding user based on information input by the designated administrator into the application program.

5. The system of claim 1, wherein each individualized usage restriction profile includes one or more restrictions on the amount of recording of video services allowed by the corresponding user based on information input by the designated administrator into the application program.

6. The system of claim 1, wherein each individualized usage restriction profile includes one or more restrictions on the purchasing of video services allowed by the corresponding user based on information input by the designated administrator into the application program.

7. The system of claim 1, further comprising a second set top box operatively coupled to a second television, wherein the video services network is communicatively coupled to the second set top box and is configured to provide video services to the second television via the second set top box, wherein the application program is configured to implement the usage restriction profiles to control video services viewing by the users on the second television.

8. The system of claim 1, wherein the application is configured to allow the one or more restrictions to extend for a specified period of time and be removed upon expiration of the specified period of time.

9. A video services control system, comprising: a set top box operatively coupled to a television; a video services network communicatively coupled to the set top box and configured to provide video services to the television via the set top box; wherein the video services network includes an application program operable to develop and implement at least one usage restriction profile for a non-designated user of the set top box based on information received from a designated administrator with authority to dictate the usage restriction profile for the non-designated user via the application program, wherein the usage restriction profile includes restrictions on video services selected from the group consisting of content, amount and timing of video services shown on the television for viewing by the non-designated user, the amount of recording of video services allowed by the non-designated user, and the purchasing of video services allowed by the non-designated user, wherein the application program is configured to receive information input by the designated administrator, develop the usage restriction profile based on the input information, and implement the usage restriction profile to control video services provided to the non-designated user; and     wherein the application program is further configured to receive supplemental information comprising:

feedback regarding the video services content, from a first user other than the designated administrator; wherein the first and second users are the persons who are subject to a usage restriction profile;

identification of video services content by the application program that is similar to the video services content dictated in the usage restriction profile by the designated administrator as allowable for viewing by the first user other than the designated administrator; and         feedback regarding the content of the video services content, from a second user other than the designated administrator, wherein the usage restriction profile for the first user other than the designated administrator is modified based upon the supplemental information; and wherein each user is assigned individualized access information, wherein upon receiving the individualized access information for one of the users, the application program is operable to implement the corresponding usage restriction profile and transmit an authorization of video rights to the set top box in accordance with the usage restriction profile.

10. The system of claim 9, further comprising a second set top box operatively coupled to a second television, wherein the video services network is communicatively coupled to the second set top box and is configured to provide video services to the second television via the second set top box, wherein the application program is configured to implement the usage restriction profile to control video services viewing by the non-designated user on the second television.

11. The system of claim 9, wherein the application program is configured to deny access to the usage restriction profile for modification by the non-designated user.

12. A method for providing video services from a video services network to a set top box operably coupled to a television, comprising: applying an application program to the video services network, wherein the program is operable to develop and implement individualized usage restriction profiles for two or more users of the set top box to control video services viewing by the users, wherein the two or more users include one or more non-designated users and a designated administrator, wherein the application program is configured to provide the designated administrator with authority to dictate the usage restriction profile for each non-designated user; the application program receiving information input from the designated administrator, the information including one or more individualized restrictions for each non-designated user on video services selected from the group consisting of content, amount and timing of video services shown on the television for viewing by the non-designated user, the amount of recording of video services allowed by the non-designated user, and the purchasing of video services allowed by the non-designated user; the application program developing a usage restriction profile for each non-designated user based on the input information received from the designated administrator unique to each non-designated user; and the application program receiving supplemental information comprising:

feedback regarding the video services content, from a first user other than the designated administrator; wherein the first and second users are the persons who are subject to a usage restriction profile;

identification of video services content by the application program that is similar to the video services content dictated in the usage restriction profile by the designated administrator as allowable for viewing by the first user other than the designated administrator; and     feedback regarding the content of the video services content, from a second user other than the designated administrator, wherein the usage restriction profile for the first user other than the designated administrator is modified based upon the supplemental information; and wherein each user is assigned individualized access information, wherein upon receiving the individualized access information for one of the users, the application program is operable to implement the corresponding usage restriction profile and transmit an authorization of video rights to the set top box in accordance with the usage restriction profile.

13. The method of claim 12, further comprising: the application program assigning one of the non-designated users individualized access information; the one of the non-designated users attempting to access the set top box to view video services by providing the individualized access information; the application program retrieving the corresponding usage restriction profile for the one of the non-designated users using the individualized access information; the application program determining whether the one of the non-designated users is authorized to view the video services according to the usage restriction profile; and the application program transmitting an authorization or denial to the set top box for the one of the non-designated users to view the video services based on the determination.

14. The method of claim 12, further comprising: one of the non-designated users attempting to modify one of the usage restriction profiles; and the application program denying access to the usage restriction profile for modification by the one of the non-designated users.

15. The method of claim 12, further comprising: operably coupling a second set top box to a second television and powering on the second set top box; connecting the second set top box to the video services network configured to provide video services to the second television via the second set top box; one of the non-designated users attempting to access the second set top box to view video services through the second television; and the application program implementing the usage restriction profile corresponding to the one of the non-designated users to control video services viewing at the second television.

16. The method of claim 12, wherein each individualized usage restriction profile includes one or more restrictions on the total amount of time that video services are shown by the television for viewing by the corresponding user in a specified period of time based on information input by the designated administrator into the application program.

17. The method of claim 12, wherein each individualized usage restriction profile includes one or more restrictions on the days of the week and times of the day that video services are shown by the television for viewing by the corresponding user based on information input by the designated administrator into the application program.

18. The method of claim 12, wherein each individualized usage restriction profile includes one or more restrictions on the amount of recording of video services allowed by the corresponding user based on information input by the designated administrator into the application program.

19. The method of claim 12, wherein each individualized usage restriction profile includes one or more restrictions on the purchasing of video services allowed by the corresponding user based on information input by the designated administrator into the application program.

\* \* \* \* \*